UNITED STATES PATENT OFFICE.

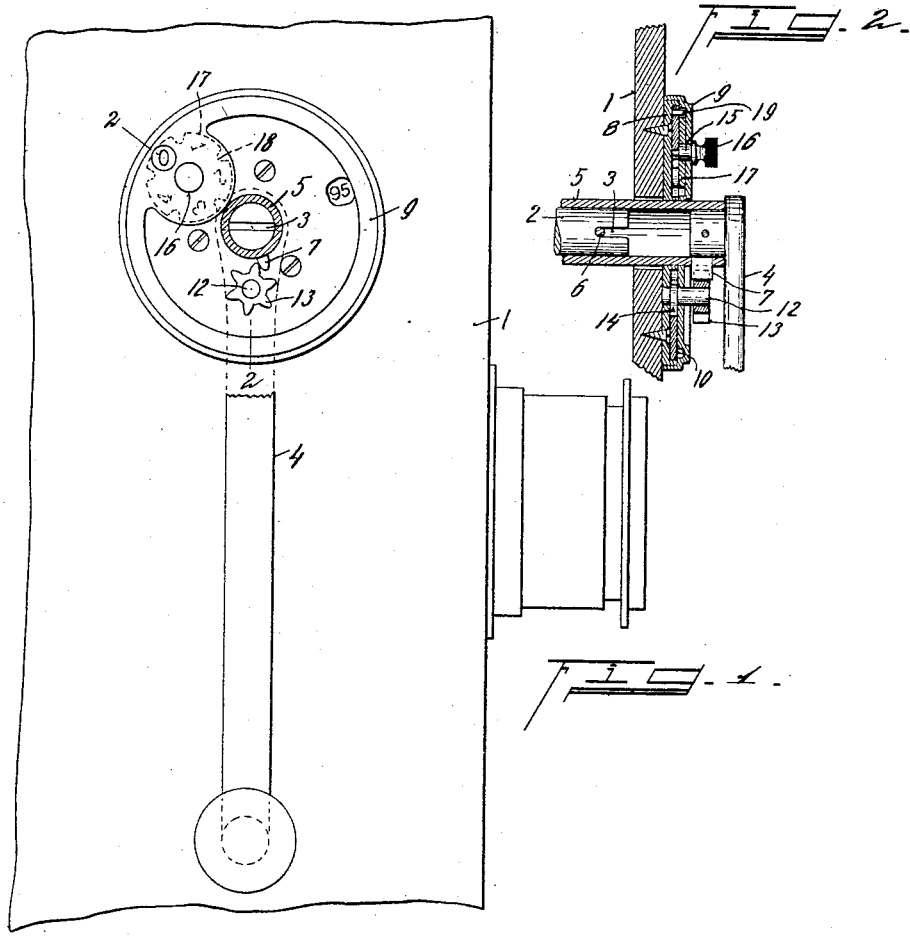
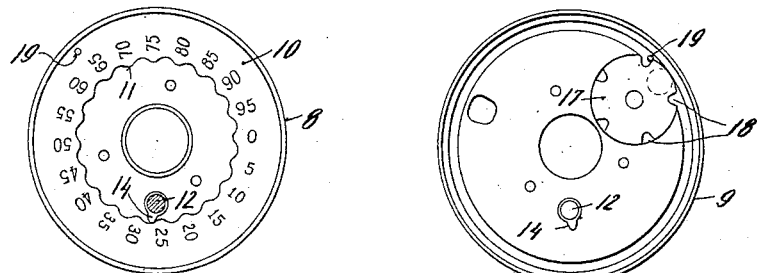

JOHN T. WELLS, OF NEWPORT, KENTUCKY, ASSIGNOR TO THE EDWARDS MFG. COMPANY, OF CINCINNATI, OHIO, A CORPORATION OF OHIO.

LENGTH-INDICATOR FOR FILMS.

1,175,852. Specification of Letters Patent. Patented Mar. 14, 1916.

Application filed May 24, 1915. Serial No. 30,056.

*To all whom it may concern:*

Be it known that I, JOHN T. WELLS, a citizen of the United States, and residing at Newport, in the county of Campbell and State of Kentucky, have invented a new and useful Improvement in Length-Indicators for Films, of which the following specification is a full disclosure.

My invention relates to a device attachable to the film feed cranks of moving picture machines, to indicate the amount of film delivered and consequently the amount of film remaining in the machine. This device is used, of course, principally in taking pictures and after the operator had put in a given length of film, say 200 feet, through the use of this indicator he knows when he is to reach the end of the film, and whether he will have to change the film in order to complete the picture he has taken.

One of the objects of the invention is to provide an exceedingly simple and cheap device, without gear trains, and which establishes a compact unit readily applicable to any standard machine.

The features of my invention will be more fully set forth in the description of the accompanying drawings, forming a part of this specification, in which:—

Figure 1 is a side elevation of a portion of a camera with the film feed indicator attached thereto. Fig. 2 is a section on line 2—2, Fig. 1. Fig. 3 is an elevation of the inner casing member and indicator annulus. Fig. 4 is an elevation of the outer casing member and attached parts, showing the dial operating pin in section and in position to engage and operate the dial.

1 represents the side frame of a camera and within the frame is a film feed shaft 2, having a split end 3, the crank handle 4 having a sleeve 5 passing through an aperture in the camera, and being secured to the shaft by a pin 6 entering the slot 3 of the shaft, the crank handle hub having a single tooth 7 for actuating the rotary elements of my indicator. This indicator comprises an inner casing member 8 tanged to the side of the camera frame so as to surround the crank handle aperture, and an outer casing member 9 telescoping therewith. These casing members are formed with a concentric central orifice forming a bearing for the crank shaft sleeve. Fitting within the casing member 8 is an annular dial 10 having an external peripheral friction bearing with the flange of member 8, the friction being sufficient to hold the annulus to the indicating positions to which it is moved. Said annulus has the indicating numerals ranging from 0 to 95, and arranged in multiples of 5, constituting the units and tens column of the indication. The interior periphery of said annulus has the notched or wavy tooth formation 11 adapted to be appropriately engaged by a toothed operating element. The inner casing member 8 is provided with a stud shaft 12 having on its outer end the toothed wheel 13 which is engaged by the tooth 7 of the crank handle. The toothed wheel has six teeth so as to be rotated one complete revolution during six rotations of the crank handle. This specific arrangement is used in connection with a film feeding mechanism which feeds five feet of film for every six turns of the crank. For other mechanisms having different film feed ratios the number of teeth of the wheel 13 will be changed to coincide with the different ratios. Upon the inner end of this stud shaft 12, within the casing of the indicator, is a single toothed operating element 14 positioned to engage the notches 11 of the indicating dial, so that said annulus is fed one notch by the operating element, each time the toothed wheel 13 is given one complete rotation, thus serving to actuate the annulus appropriately to the indicating figures comprising serially displayed multiples of 5. The outer casing member 9 has a stud shaft 15, with a setting knob 16, and on said stud shaft within the casing is a dial 17 having notches 18 engaged by the pin 19, projecting outwardly from the annulus, so that said dial moves one notch for each complete rotation of the annulus, and said dial being also provided with a series of figures, say 0 to 4, for representing the one hundreds column of film length, this selection enabling the reading of a 500 feet film. Of course the casing is apertured appropriate to the series of figures on the annulus and the series of figures on the dial to enable a reading of the coördinating registration. This indicator can be made for a very slight amount, has very few parts, no gearing, does not readily get out of order, and can be conveniently attached to any moving picture camera.

Having described my invention, I claim:—

1. A film feed indicator for a moving picture camera comprising telescoping casing members attachable to the side frame of the camera and being apertured to provide a crank shaft bearing, an annulus having a friction bearing in the casing, and provided with display figures, the inner periphery of said annulus being notched, there being a stud shaft in the casing having an operating element engaging the notches of said periphery, a toothed wheel on said stud shaft exterior of the casing, and a tooth on the crank shaft for engaging said toothed wheel, said casing being apertured to appropriately display said figures as they are serially moved into position.

2. A film feed indicator for a moving picture camera comprising telescoping casing members attachable to the side frame of the camera, and being apertured to provide a crank shaft bearing, an annulus having a friction bearing in the casing and provided with display figures, the inner periphery of said annulus being notched, there being a stud shaft in the casing, having an operating element engaging the notches of said periphery, a toothed wheel on said stud shaft exterior of the casing, a tooth on the crank shaft for engaging said toothed wheel, said casing being apertured to appropriately display the said figures as they are serially moved into position, a rotatable notched disk journaled in the casing eccentrically thereof and having a series of display figures, the casing being apertured appropriately to display said figures, and a pin on the annulus positioned for engaging said notches to advance said dial.

3. A film feed indicator for a moving picture camera comprising a detachable casing having a central crank receiving aperture, a camera operating crank, a frictionally retained rotatable indicator annulus within the casing having a plurality of toothed projections, an operating element adapted to engage said projections to rotate the annulus, an indicator dial pivotally mounted in the casing within the periphery of the annulus, means carried by the annulus for advancing the dial one degree during a complete rotation of the annulus, and means intermediate the operating element and the crank for functioning said operating elements at predetermined intervals.

In witness whereof, I hereunto subscribe my name, as attested by the two subscribing witnesses.

JOHN T. WELLS.

Witnesses:
EMMA SPENER,
L. A. BECK.

Copies of this patent may be obtained for five cents each, by addressing the "Commissioner of Patents, Washington, D. C."